United States Patent [19]

Hertzog, Jr. et al.

[11] 4,317,993

[45] Mar. 2, 1982

[54] METHODS AND APPARATUS FOR CONSTITUENT ANALYSIS OF EARTH FORMATIONS

[75] Inventors: Russel C. Hertzog, Jr., Ridgefield; William B. Nelligan, Danbury, both of Conn.

[73] Assignee: Schlumberger Technology Corporation, New York, N.Y.

[21] Appl. No.: 40,320

[22] Filed: May 18, 1979

Related U.S. Application Data

[63] Continuation of Ser. No. 869,584, Jan. 16, 1978, abandoned.

[51] Int. Cl.³ .............................................. G01V 5/00
[52] U.S. Cl. .................................................... 250/270
[58] Field of Search ........................ 250/262, 269, 270

[56] References Cited

U.S. PATENT DOCUMENTS

| | | | |
|---|---|---|---|
| 3,521,064 | 7/1970 | Moran et al. | 250/269 X |
| 3,739,171 | 6/1973 | Scott | 250/270 |
| 3,780,303 | 12/1973 | Smith, Jr. et al. | 250/270 X |
| 3,842,265 | 10/1974 | Pitts, Jr. | 250/270 |
| 3,886,355 | 5/1975 | Culver | 250/270 |
| 3,930,153 | 12/1975 | Scott | 250/270 |
| 3,943,362 | 3/1976 | Peelman | 250/270 X |
| 4,055,763 | 10/1977 | Antkiw | 250/270 |

*Primary Examiner*—Davis L. Willis
*Attorney, Agent, or Firm*—Brumbaugh, Graves, Donohue & Raymond

[57] ABSTRACT

In the illustrative embodiments of the invention disclosed, the composition of an earth formation is investigated by repetitively irradiating the formation with bursts of fast neutrons and generating an energy spectrum of the gamma rays resulting from the inelastic scattering of such neutrons by nuclei of the formation. The inelastic scattering gamma ray spectrum is analyzed by comparing it with a composite spectrum, made up of standard spectra of constituents postulated to comprise the formation, to determine the proportions in the formation of the postulated constituents. A background energy spectrum is generated from gamma rays detected during periods between neutron bursts and is utilized to provide one or more standard background spectra for use in the analysis of the inelastic scattering gamma ray spectra. The standard background spectrum or spectra are preferably updated on a repetitive basis to reflect the current background component in the detected inelastic scattering gamma ray spectrum. More reliable information is thereby obtained of the presence of oil in the formation through the derivation of such indicators as the carbon/oxygen ratio, calcium/silicon ratio and the like. Constituent analysis may also be made of the detected background gamma ray spectrum to determine the proportions of the formation constituents contributing to such spectrum, and the standards for the most significant background contributors or the composite spectrum produced by such standard spectra may be used among the standard spectra for the inelastic scattering spectrum analysis in lieu of the detected background spectrum itself.

58 Claims, 8 Drawing Figures

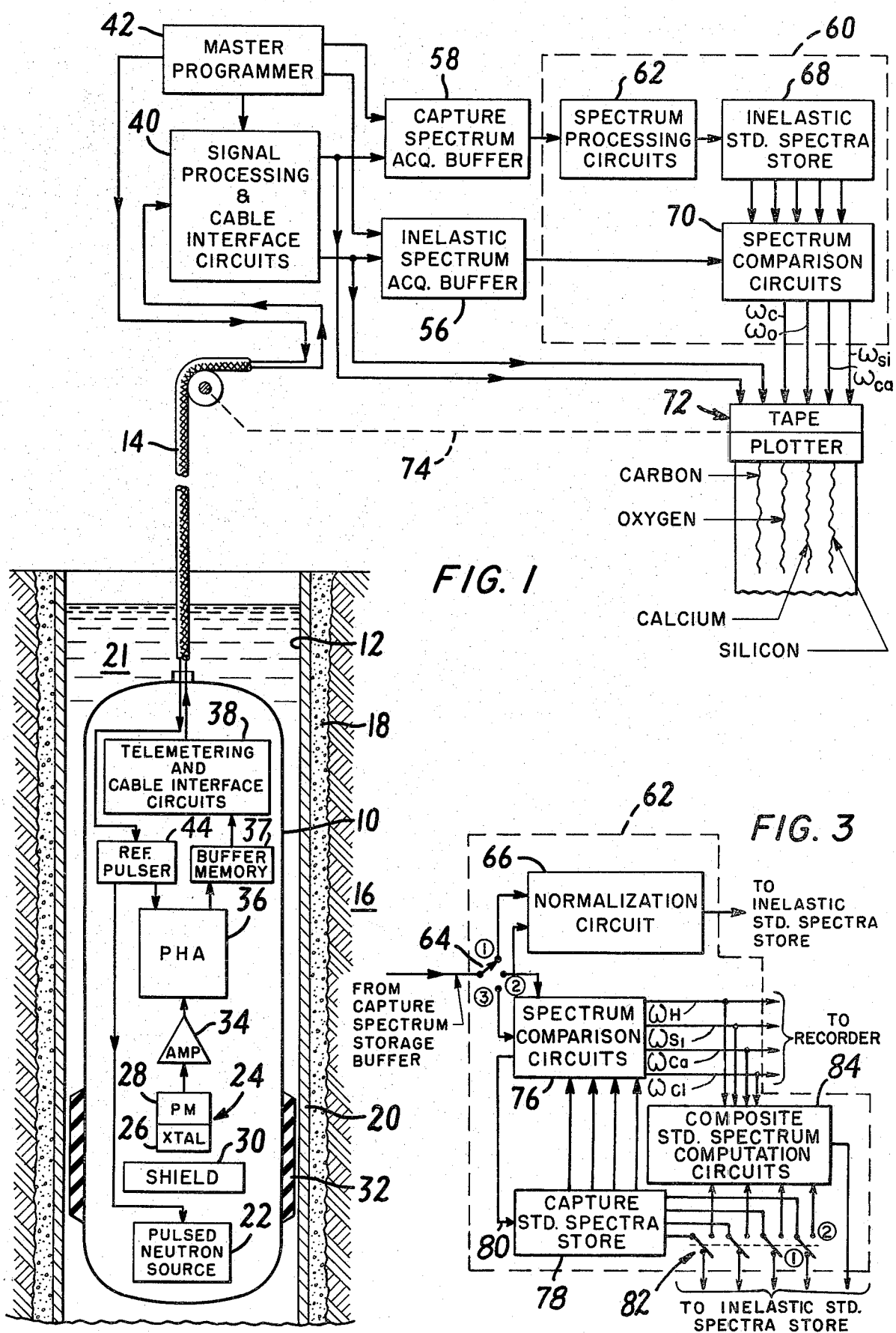

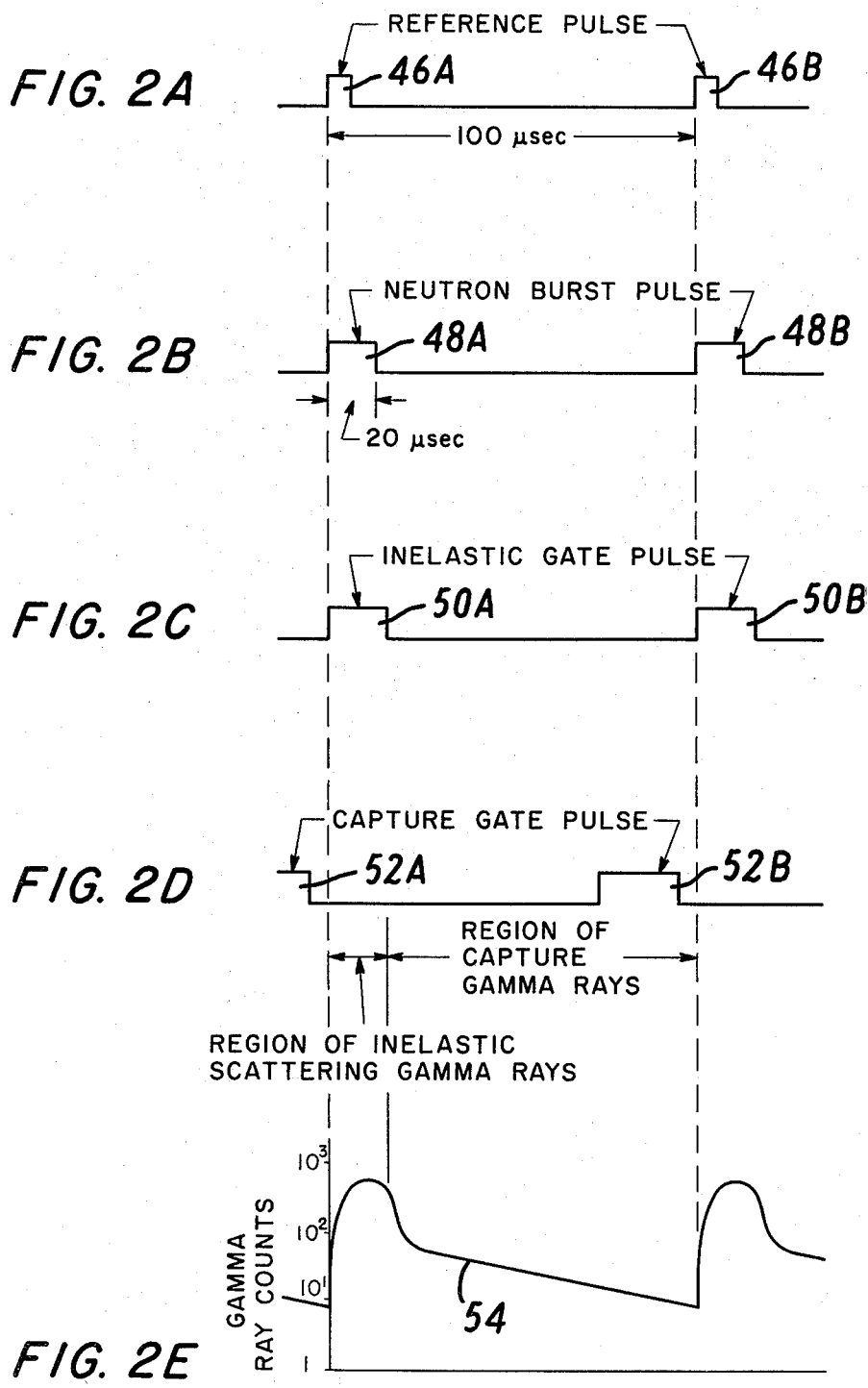

METHODS AND APPARATUS FOR CONSTITUENT ANALYSIS OF EARTH FORMATIONS

This is a continuation of application Ser. No. 869,584, filed Jan. 16, 1978, now abandoned.

BACKGROUND OF THE INVENTION

1. Field of the Invention

The present invention relates in general to nuclear well logging, and pertains in particular to improved methods and apparatus for analyzing inelastic scattering gamma ray energy spectra to provide more accurate information of the composition of earth formations surrounding a well bore.

2. The Prior Art

Heretofore, various techniques have been utilized to process gamma ray energy spectra for borehole constituent analysis. In the case of inelastic scattering gamma ray energy spectra, it is known that analysis of the spectra to identify the contributions thereto due to carbon and oxygen provides useful information of the presence of oil in a formation. Additional information concerning the composition of the formation, such as its lithology for instance, is however frequently required before an unambiguous determination of the presence of oil can be made. A suitable lithology indicator for this purpose might comprise the ratio of inelastic scattering gamma ray contributions for calcium and silicon.

The derivation of the foregoing information concerning carbon, oxygen, calcium and silicon, and possibly other constituents of the formation and well bore, depends upon accurate constituent analysis of the formation gamma ray spectra. An important and basic technique for performing such analysis is disclosed in U.S. Pat. No. 3,521,064, issued on July 21, 1970 to Moran et al. In accordance with the Moran et al. teaching, a detected gamma ray energy spectrum for a formation of unknown composition is compared with a composite spectrum made up of weighted standard spectra of the constituents postulated to comprise the formation. The weight coefficients for the standard spectra which give the best fit of the composite spectrum to the unknown spectrum, as determined, for example, by the method of least squares, represent the relative proportions of the constituents in the formation. By appropriate selection of the standard spectra, the proportions of the constituents of interest, such as carbon, oxygen, calcium, silicon, etc., may be obtained, from which the desired information regarding oil content may be derived.

Although the Moran et al. technique, as disclosed in U.S. Pat. No. 3,521,064, is applicable for the purpose of the present invention and in this respect provides substantial advantages relative to other prior art techniques, the present invention is concerned with methods and apparatus which provide still better results, particularly in connection with the analysis of inelastic scattering gamma ray spectra.

To obtain statistically accurate inelastic scattering gamma ray spectra it is desirable to irradiate the formation with neutrons at as high a repetition rate as is practicable. Closely spaced neutron bursts have the disadvantage that background gamma rays, resulting in this instance predominately from thermal neutron capture reactions between formation constituents and neutrons from one or more preceding bursts, will be present during the detection periods for the inelastic scattering gamma rays. Such capture gamma rays will of course be sensed by the detector and, unless compensated for, will tend to degrade the inelastic scattering gamma ray spectra.

Moran et al. suggest in U.S. Pat. No. 3,521,064 that the capture gamma ray component in the detected inelastic scattering gamma ray spectrum may be accounted for by previously generating a separate "background" spectrum representative of residual capture gamma radiation from prior bursts and including such spectrum as a standard in the composite spectrum. According to the Moran et al. patent, the standard background spectrum is taken beforehand in a reference borehole or test pit. This, however, does not necessarily reflect the real in situ capture gamma ray spectrum, which varies with change in neutron source strength, sonde environment, sonde performance, etc., and thus may lead to inaccuracies in the constituent proportions obtained from the spectrum matching process.

As evidenced by U.S. Pat. No. 3,780,303 to Smith et al., it has also been proposed in the prior art to detect the level of background gamma radiation immediately before each neutron burst, and then subtract that level from the inelastic scattering gamma ray counts obtained during the burst. Since the gamma rays observed during the background detection period result predominately from thermal neutron capture, the assumption is that the inelastic scattering gamma ray spectrum will be corrected in a proper way for the presence of capture gamma rays lingering from prior bursts. This, however, is not the case.

The Smith et al. background gamma ray count reflects only an approximation of the total background level prevailing during the succeeding neutron burst (assuming that the background detection period closely precedes the burst and that the inelastic scattering detection period is short relative to the thermal neutron decay time constant of the formation). It does not afford information of the spectral character or shape of the capture gamma ray spectrum and thus does not accurately compensate the inelastic gamma ray spectrum for the influence of residual capture gamma radiation from prior neutron bursts.

SUMMARY OF THE INVENTION

It is therefore an object of the invention to provide methods and apparatus for analyzing inelastic scattering gamma ray energy spectra which correctly compensate such spectra for the presence of background gamma radiation, including thermal neutron capture gamma radiation.

It is a further object of the invention to provide methods and apparatus of the kind referred to which effect such compensation in a way which is substantially independent of the thermal neutron capture time constant of the formation under investigation and which takes into account variations in the thermal neutron capture background spectrum due to changes in environmental parameters.

It is another object of the invention to provide improved methods and apparatus for formation constituent analysis which facilitates the analysis during the same logging run of both inelastic scattering gamma ray energy spectra and thermal neutron capture gamma ray energy spectra.

These and other objects of the invention are attained by the provision of methods, and apparatus useful in performing such methods, in which the unknown inelastic scattering gamma ray energy spectrum of a formation is analyzed by comparing it with a composite spectrum, made up of weighted standard spectra for the constituents postulated to comprise the formation and to have contributed to the unknown inelastic scattering gamma ray spectrum, to determine the proportions in the formation of the postulated constituents. One or more standard background spectra are included among the standard spectra making up the composite spectrum, and, in accordance with the invention, such standard background spectrum or spectra are generated substantially concurrently with the unknown inelastic scattering gamma ray spectrum. In this way the background component of the unknown inelastic scattering spectrum is properly and accurately taken into account, with the result that the proportions of the constituents contributing to the inelastic scattering spectrum are more accurately determined. More reliable information is therefore obtained of the presence of oil in the formation, as, for example, from the proportions of such formation constituents as carbon, oxygen, silicon, calcium and the like.

Since the inelastic scattering gamma ray spectrum of the formation is detected by repetitively irradiating the formation at a high rate with bursts of fast neutrons, the background gamma radiation present and contributing to the detected inelastic scattering spectrum is due predominately to gamma rays emitted upon thermal neutron capture interactions between neutrons from preceding bursts and formation constituents. According to the invention, therefore, capture gamma rays are detected during time intervals between neutron bursts during which thermal neutron capture gamma interactions predominate, and an energy spectrum of the detected capture gamma rays is developed. This capture spectrum, following normalization to the same total count as the other standard spectra, may then be used as the standard background spectrum in the analysis of the unknown inelastic scattering spectrum. Alternatively, the detected capture gamma ray spectrum may first be pre-analyzed, by comparison with a composite spectrum made up of weighted standard spectra of constituents postulated to have contributed to the detected capture spectrum, to determine which constituents have contributed significantly to the capture spectrum. The standard spectra for such significant capture gamma ray contributing constituents may then be used as standard background spectra for analysis of the inelastic scattering gamma ray spectrum.

The determination of which constituents have contributed significantly to the detected capture gamma ray spectrum is preferably carried out by determining the proportions of the postulated constituents producing the composite spectrum which most nearly matches the detected capture gamma ray spectrum and eliminating all constituents whose proportions are below a predetermined level. As a further feature of the invention, the proportions of the constituents thus determined are recorded, along with the proportions of the constituents found to have contributed to the detected inelastic scattering gamma ray spectrum, to provide still further information concerning the composition of the formation. If desired, constituent analysis of the capture gamma ray spectrum may be carried out in this manner, and the proportions thus determined recorded, even though the detected capture gamma ray spectrum is itself used as the standard background spectrum for analysis of the inelastic scattering gamma ray spectrum.

In a further embodiment, the composite spectrum which most nearly matches the detected capture gamma ray spectrum may be used as a composite standard background spectrum for the inelastic scattering gamma ray analysis. The composite standard background spectrum may be made up of all of the standard capture gamma ray spectra or it may be generated from the standards for only the most significant capture gamma ray contributors.

Preferably, the detected background, or capture gamma ray, spectrum is repetitively updated during logging. This insures that the background spectrum used for constituent analysis of the unknown inelastic scattering spectrum will reflect as accurately as possible the actual background component in the unknown spectrum. It will also account for variations during the spectrum detection and generation operations in factors, such as sonde performance, sonde environment, etc., which affect the shape of the detected spectra.

BRIEF DESCRIPTION OF THE DRAWINGS

Further objects and advantages of the invention will be apparent from the following detailed description of exemplary embodiments thereof, taken in conjunction with the accompanying drawings, in which:

FIG. 1 is a schematic view of an embodiment of logging apparatus constructed in accordance with the invention;

FIGS. 2A-2D are timing diagrams useful with the apparatus of FIG. 1. FIG. 2E is a diagrammatic representation of the time distribution of gamma rays resulting from the irradiation of an earth formation with time-spaced bursts of fast neutrons;

FIG. 3 is a schematic view of one embodiment of the capture gamma ray spectrum processing circuits of FIG. 1.

DETAILED DESCRIPTION

Figure 4:
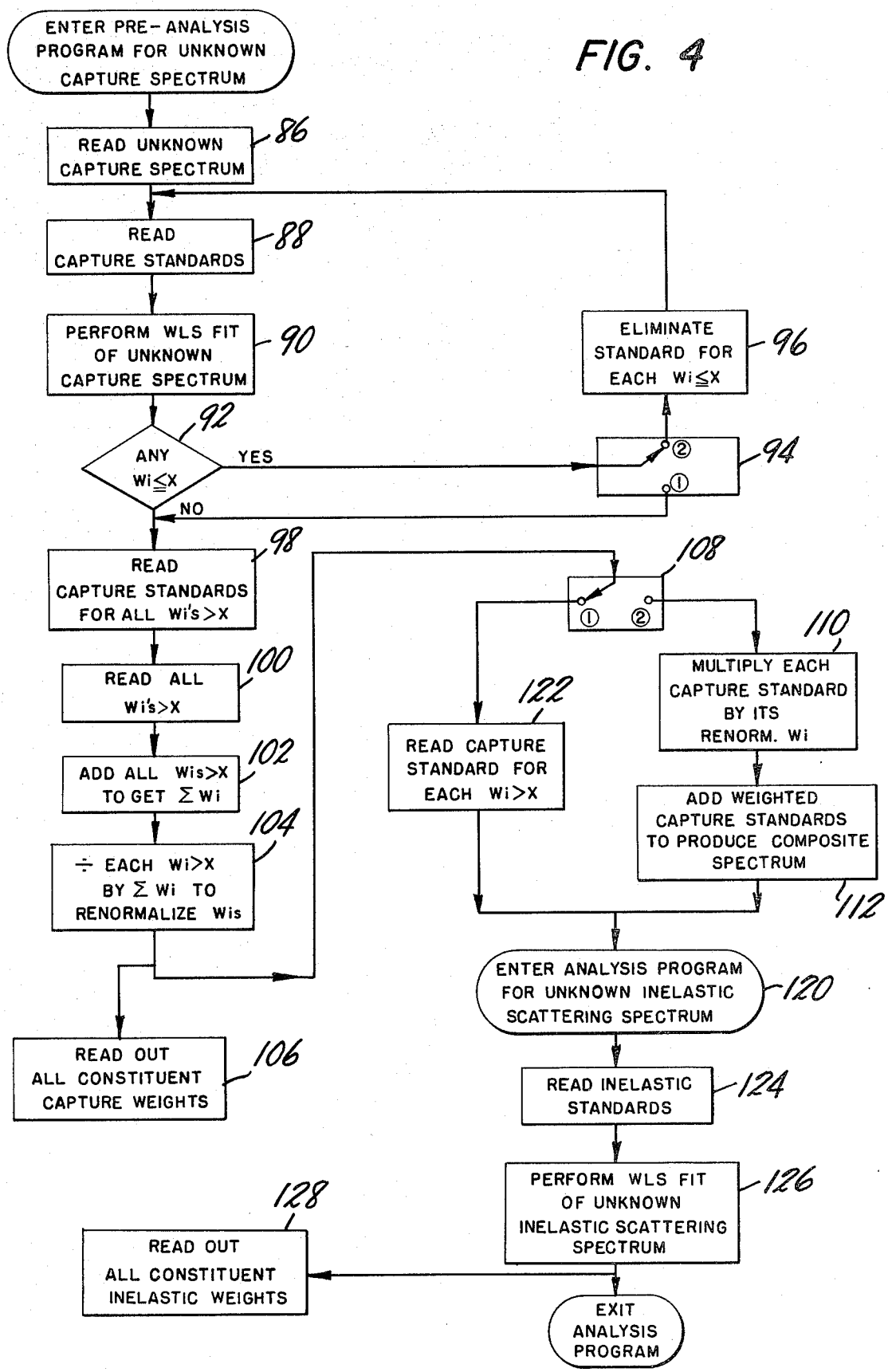
FIG. 4 shows a flow diagram for carrying out pre-analysis of a detected capture gamma ray spectrum to identify those constituents which have contributed significantly by way of background to the detected inelastic scattering gamma ray spectrum and thereafter for analyzing the inelastic scattering spectrum utilizing either the background standards identified in the pre-analysis step or a composite standard spectrum computed from such standard spectra.

Referring now to the drawings and in particular to FIG. 1, a representative embodiment of the invention includes a fluid tight, pressure and temperature resistant well tool or sonde 10 that is adapted to be suspended in a well bore 12 by an armored cable 14 for investigating a subsurface earth formation 16. The well bore 12 is illustrated as cased, including the usual annulus of cement 18 and steel casing 20, and as containing a well fluid 21. Although no tubing is shown in the well bore, the tool if desired may be sized for through-tubing use. It will be understood that the invention has application also to open hole logging.

The sonde 10 includes a pulsed neutron source 22 and a radiation detector 24. The neutron source 22 preferably is of the accelerator type described in U.S. Pat. Nos. 3,461,291 to C. Goodman and 3,546,512 to A. H. Frentrop, both of which are commonly owned with this application. This type of neutron source is particularly adapted to generate discrete bursts of high energy or fast neutrons, e.g. at 14 MeV, of controlled duration and repetition rate.

The detector 24 may be of any construction appropriate to the detection of gamma rays and to the production of a pulse signal in response to each detected gamma ray having an amplitude representative of the energy of the detected gamma ray. Generally, such a detector includes a scintillation crystal 26 which is optically coupled to a photomultiplier tube 28. The crystal is preferably of the thallium-activated sodium iodide type, although any suitable crystal such as thallium or sodium-activated cesium iodide, may be used. Alternatively, a solid state detector, having for example a germanium crystal, might be employed. A neutron shield 30 may be positioned between the source 22 and the detector 24 to reduce bombardment of the detector by neutrons emanating directly from the source.

Electrical power for the sonde 10 is supplied through the cable 14 from a source of power (not shown) at the surface. Suitable power sources (not shown) are also included in the sonde 10 for the purpose of driving the neutron source 22, the detector 24 and the other downhole electronics. The sonde 10 may be surrounded by a boron carbide impregnated sleeve 32 located generally in the region of the source 22 and detector 24. The sleeve 32 acts as a shield to minimize the detection of gamma radiation originating from neutron interactions in the immediate vicinity of the source and detector.

An amplifier 34 acts on the output pulses from the photomultiplier 28. The amplified photomultiplier pulses are thereafter applied to a pulse height analyzer (PHA) 36, which may be of any conventional type such as a single ramp (Wilkinson rundown) type. It will be understood to include the usual pulse height discriminators, for selection of the gamma ray energy range to be analyzed, and linear gating circuits, for control of the time portion of the detector signal train to be analyzed.

PHA 36 segregates the detector pulses into predetermined channels according to their amplitude and supplies signals in suitable digital form representing the amplitude of each analyzed pulse. The digital outputs of PHA 36 are stored in a buffer memory 37 and then transferred to telemetering and cable interface circuits 38 for transmission over cable 14 to the surface. At the surface, the cable signals are received by signal processing and cable interface circuits 40. It will be understood that the circuits 38 and 40 may be of any suitable known construction for encoding and decoding, multiplexing and demultiplexing, amplifying and otherwise processing the signals for transmission to and reception by the uphole electronics. Appropriate circuits are described, for example, in U.S. Pat. No. 4,012,712, issued Mar. 15, 1977 to William B. Nelligan for "System for Telemetering Well Logging Data".

The operation of the sonde 10 is controlled by signals sent downhole from a master programmer 42 located at the surface. These signals are received by a reference pulser 44 which, in response thereto, transmits control signals to the neutron source 22 and to the PHA 36. Representative timing diagrams for such control signals are depicted in FIGS. 2A-2D.

FIG. 2A illustrates two successive pulses 46A and 46B transmitted from the reference pulser 44 to the pulsing circuit of the neutron source 22. Upon receipt of the reference pulses, the pulsing circuit generates two sharp fire pulses 48A and 48B (FIG. 2B), thereby causing the source 22 to emit two corresponding sharp bursts of fast neutrons. For purposes of constituent analysis of inelastic scattering gamma ray spectra in accordance with the invention, the neutron bursts are preferably of short duration, e.g. 20 μsec, and are repeated at short intervals, e.g. every 100 μsec, so as to provide satisfactory statistics in the spectrum analysis procedure.

The control signals transmitted from the reference pulser 44 to the PHA 36 enable the linear gating circuits of the PHA during two different time periods in relation to each neutron burst, one, indicated at 50A and 50B in FIG. 2C, substantially coincident with the neutron burst and the other, shown at 52A and 52B in FIG. 2D, at a selected time between neutron bursts. The time distribution of gamma rays resulting from the irradiation of a formation with a burst of fast neutrons is represented by the graph 54 in FIG. 2E. As may be seen from FIG. 2E, the detector pulses passed to the PHA 36 during the gating periods 50A and 50B of FIG. 2C will correspond predominately to inelastic scattering gamma rays and the detector pulses passed to the PHA during the gating periods 52A and 52B of FIG. 2D will correspond predominately to background gamma rays, i.e., to gamma rays resulting from neutron interactions other than inelastic scattering interactions. For the high burst-rate timing sequence illustrated in FIGS. 2A-2D, the detector pulses during the background gating periods 52A and 52B of FIG. 2D will correspond predominately to gamma rays produced by thermal neutron capture of neutrons from the preceding burst. As is apparent from FIG. 2E, such capture gamma radiation will of course also represent the predominate background component in the otherwise predominately inelastic scattering gamma radiation detected during the gating periods 50A and 50B of FIG. 2C.

Since in furtherance of the invention, it is desirable to obtain as pure an inelastic scattering gamma ray spectrum as possible, the presence of such capture background in the inelastic spectrum must be compensated for. This is done, according to the invention, by generating the energy spectrum of the detected capture gamma rays and utilizing such spectrum to provide a standard background spectrum or spectra for use, as described hereinafter, in analysis of the inelastic scattering gamma ray spectrum. By use of a concurrently generated background standard, as opposed to the aforementioned prior art compensation techniques of subtracting background counts from the inelastic scattering gamma ray counts or of using a laboratory or test pit background standard, the inelastic spectrum is more accurately and correctly compensated for background.

Referring now to FIG. 1, the inelastic scattering gamma ray spectrum and the thermal neutron capture gamma ray spectrum are generated by data acquisition buffers 56 and 58, respectively, which, under the control of the master programmer 42, accumulate the appropriate counts-per-channel signals from the signal processing and cable interface circuits 40. Specifically, the inelastic spectrum acquisition buffer 56 accumulates the inelastic scattering gamma ray counts-per-channel signals for a period long enough to give a statistically satisfactory spectrum, e.g. on the order of 20 seconds for the timing sequence of FIGS. 2A-2D, and is then instructed by the master programmer 42 to output the spectrum, recycle to zero, and accumulate a new spectrum for a like period. Similarly, the capture spectrum acquisition buffer 58 accumulates the capture gamma counts-per-channel data for a specified period. Where the capture spectrum is to be used as a standard in the analysis procedure for the inelastic scattering spectrum, it is desirable that the capture spectrum have greater statistical reliability than the inelastic spectrum. The counting time of the capture acquisition buffer 58 may therefore be longer than the counting time of the inelastic scattering acquisition buffer 56. For example, with the timing sequence of FIGS. 2A–2D, the accumulation time for the capture spectrum might be four times as long, e.g. on the order of 80 seconds, as the accumulation time for the inelastic spectrum. At the end of the counting period, the acquisition buffer 58 is read out and recycled to accumulate a new background spectrum. Generally, the accumulation time for the capture spectrum should be selected to maintain the background spectrum as current as possible, while at the same time counting for a sufficiently long time to reduce statistical errors to permissible limits. It will be appreciated, therefore, that the background spectrum is repetitively updated as the sonde 10 is moved through the well bore, and thus automatically takes into account variations in such factors as sonde environment, shonde performance, source strength and the like which affect the shape of the capture spectrum. It will also be understood that, for purposes of permitting the separate accumulation of the inelastic spectrum and the capture spectrum, the control signals from PHA 36 to the buffer memory 37 will include digital address information, e.g., flag bits, which designate the particular gating period 50A, 50B or 52A, 52B during which each analyzed gamma ray was detected.

Following accumulation in the acquisition buffers 56 and 58, the inelastic scattering spectrum and the capture spectrum are transferred to storage buffers (not shown) in a constituent analysis computer 60. The computer 60 may comprise a general purpose digital computer, such as the PDP-11 computer manufactured by the Digital Equipment Corporation, Maynard, Mass., or alternatively, it may comprise an analog computer. In either event, it will be understood that the computer 60 is suitably programmed or constructed to perform the spectrum matching and constituent proportions determining functions described in Moran et al. U.S. Pat. No. 3,521,064, the pertinent portions of which are hereby incorporated by reference. In addition, the computer 60 is capable of carrying out certain spectrum processing and pre-analysis steps, as described hereinafter, preparatory to the analysis of the inelastic scattering spectrum.

Within the computer 60, the signals representing the inelastic scattering spectrum are applied to the spectrum comparison circuits 70 for comparison with the standard spectra in the manner of the Moran et al. U.S. Pat. No. 3,521,064. The signals representing the capture spectrum, however, are first applied to spectrum processing circuits 62. As shown in more detail in FIG. 3, the spectrum processing circuits 62 preferably comprise circuits for selectively carrying out a number of operations on the capture spectrum signals. A three-position position switch or latch 64 permits selection of the particular operation or operations to be performed.

When switch 64 is in the first or uppermost position, as shown in FIG. 3, the signals representing the capture gamma ray spectrum, i.e. the signals representing the accumulation of pulses in the various channels developed by acquisition buffer 58, are applied to a normalization circuit 66, wherein the signals are normalized to the same total count as the other standard spectra to be used in the comparison analysis of the inelastic spectrum. This is simply a division operation and may readily be implemented in a known manner in either a digital computer or an analog computer. Thereafter, the normalized spectrum signals are transferred to the store 68 (FIG. 1), for the inelastic standard spectra as the standard background spectrum. Store 68 will of course contain similarly normalized signals for each of the other inelastic standards making up the composite spectrum with which the inelastic scattering spectrum is compared. The manner in which such other standard inelastic scattering gamma ray spectra are generated is described in the referenced portions of Moran et al. U.S. Pat. No. 3,521,064. As there described, a standard spectrum is included for each constituent postulated to be present in the formation and contributing to the detected inelastic scattering gamma ray spectrum. In addition to the background (capture) spectrum, therefore, the inelastic standard spectra provided in store 68 might include, for example, spectra for oxygen, carbon, calcium and silicon.

As described in Moran et al. U.S. Pat. No. 3,521,064, the signals representing the unknown inelastic scattering gamma ray spectrum, as accumulated in acquisition buffer 56, are compared with signals representing a linear combination of signals representing the weighted standard inelastic spectra to determine the proportions of the constituents which provide the combination, i.e., the composite spectrum, which most nearly matches the unknown inelastic scattering spectrum. This comparison is made in the spectrum comparison circuits 70 of FIG. 1. Preferably, the "least squares" criterion is used to determine when a best fit has been obtained between the composite spectrum and the unknown spectrum. The weights ($\omega_i$) for the respective standard spectra which produce the best fit represent the proportions of the corresponding gamma ray yields from the constituents in the formation. As indicated in FIG. 1, the comparison circuits 70 generate the constituents weights ($\omega_i$) and transmit signals representative thereof to a recoder 72. The recorder 72 includes the conventional visual and magnetic tape components for making the customary record of logging signals as a function of depth. The usual cable-following mechanical linkage 74 for driving the recorder 72 in synchronism with the cable 14 is provided for this purpose. Advantageously, suitable ratios of such constituent weights, e.g. the carbon/oxygen ratio and the calcium/silicon ratio, may be formed and recorded as a function of tool depth.

Although the computer 60 is depicted in FIG. 1 as located at the well site, it may if desired be located remotely and operated on recorded representations of the counts-per-channel data transmitted over the cable 14. To that end, the output signals from the signal processing and cable interface circuits 40 may be recorded directly on tape in the manner indicated in FIG. 1.

As a further feature of the invention, constituent analysis of the detected capture gamma ray spectrum may also be carried out to provide still further information concerning the formation. In the second or middle position of switch 64 (FIG. 3), therefore, the signals from the capture spectrum storage buffer (not shown) are applied both to the normalization circuit 66, for conversion to a standard background spectrum as described above, and to the spectrum comparison circuits 76 for comparison, in accordance with the spectrum matching technique of the Moran et al. patent, with signals representing a composite spectrum made up of standard capture gamma ray spectra for formation constituents postulated to have contributed to the detected capture spectrum. The standard capture spectra are taken in the manner described in the Moran et al. patent, normalized to a common count, and previously stored in a store 78 in circuits 62. As described in the Moran et al. patent, such spectra might include spectra for hydrogen, silicon, calcium, sodium, chlorine and possibly other formation constituents. Signals representative of the capture standards are supplied from store 78 to the spectrum comparison circuits 76, and are there processed with the signals representing the detected capture gamma ray spectrum to provide the weights (proportions) of the postulated constituents which produce the best fit of the composite spectrum to the detected spectrum. Signals representative of such weights are generated by the comparison circuit 76 and transmitted, as indicated in FIG. 3, to the recorder 72 for recording.

Suitable ratios of the capture constituent proportions may also be formed and recorded to provide information of such formation parameters as porosity, lithology, salinity, shalines and the like. Exemplary forms of such ratios are described, for example, in the copending, commonly-owned application Ser. No. 686,781, filed May 17, 1976, by S. Antkiw for "Neutron Characteristic and Spectroscopy Logging Methods and Apparatus", and now U.S. Pat. No. 4,055,763.

Instead of using the normalized detected capture gamma spectrum as the standard inelastic scattering background spectrum, it may be desirable in certain circumstances to first analyze the capture spectrum, by the aforementioned weighted least squares technique, to identify the formation constituents which have contributed significantly to the detected inelastic spectrum and then include the standard capture gamma ray spectrum for each constituent so identified as a background standard among the standard spectra used for analysis of the detected inelastic scattering spectrum. Since the variances of the constituent weights increase with the number of standards used in a weighted least squares fit, as a general matter the number of standard spectra usd should not be unnecessarily increased. On the other hand, the accuracy of the weighted least square fitting technique depends upon there being a standard spectra for each significant constituent of the formation. In accordance with this feature of the invention, therefore, only the capture gamma ray standards for those constituents found to have contributed significantly to the detected capture spectrum are included among the inelastic standards. If desired, of course, all of the constituent capture spectra may be included among the inelastic standards.

In furthermore of this feature, the third or lower position of switch 64 in the spectrum processing circuits of FIG. 3 is arranged to couple the signals from the capture spectrum storage buffer (not shown) to the spectrum comparison circuits 76 but not to the normalization circuit 66. A weighted least squares fit of the detected capture spectrum to the composite spectrum made up of the weighted standard capture spectra from store 78 is carried out by circuits 76 to identify the significant contributors to the detected capture spectrum. Upon identification of such constituents, which may include all or only some of the postulated constituents, the comparison circuits 76 instruct the capture standard spectra store 78, via conductor 80, to transmit signals representing the capture standard spectra for those constituents to the inelastic standard spectrum store 68. For this mode of operation, the ganged double-pole switch 82 will be in the lower or first position shown in FIG. 3. These capture standard spectra then become the standard background spectra for the inelastic spectrum analysis and are transferred from store 68, along with the other inelastic standard spectra, to the spectrum comparison circuits 70 for that purpose. The constituent weights determined in the course of the capture spectrum analysis, e.g. $\omega_H$, $\omega_{Si}$, $\omega_{Ca}$ and $\omega_{Cl}$, etc., may if desired be recorded by recorder 72.

Rather than using the capture standard spectra directly as background standards for the inelastic scattering gamma ray analysis, they may be used instead, according to still another feature of the invention, to compute a composite standard spectrum which then becomes a single background standard for the inelastic spectrum analysis. Such use of a single composite background spectrum, made up of weighted capture standard spectra, has the advantage relative to the use of a plurality of individual capture gamma standards of minimizing the number of spectra used for background-compensation purposes, thereby minimizing the variances of the constituent weights for the inelastic scattering gamma ray contributors. It also affords the advantage relative to the use of the detected capture gamma ray spectrum itself as the background standard of having better defined peaks, since it is computed from standard spectra of greater statistical accuracy than the detected capture gamma ray spectrum. When the composite-spectrum mode of operation is to be employed, the ganged switch 82 in the spectrum processing circuits 62 is thrown to the upper or second position in FIG. 3 to connect the capture gamma ray standard spectra read out of the store 78, upon instruction over conductor 80 as aforementioned, to the composite standard spectrum computation circuits 84. As previously pointed out, these may include all or only selected significant ones of the standard spectra stored in store 78. The weights outputted by the circuits 76 are also applied to the computation circuits 84, as is shown in FIG. 3.

Circuits 84 will be understood to include suitable multiply, add and divide circuits for computing from the constituent weights ($\omega_i$) determined by the comparison circuits 76 and the corresponding capture standard spectra the composite spectrum which was found in the comparison step to have most nearly matched the detected capture gamma ray spectrum. That is to say, the composite spectrum which gave the best fit to the detected unknown spectrum, and from which the constituent weights ($\omega_i$) were determined in comparison circuits 76, is computed, or reproduced, from the constituent weights and the capture standard spectra. Specifically, the computation circuits 84 include circuits for (1) multiplying each standard spectra read out of store 78 by the weight ($\omega_i$) for that constituent, as determined in the comparison circuits 76, (2) linearly adding the weighted spectra to produce a composite spectrum, and, if necessary, (3) normalizing the composite spectra by dividing it by the sum of the weights ($\omega_i$). Conventional circuits for carrying out these functions are well known and, therefore, are not illustrated herein in detail.

Normalization of the composite spectrum is not required when all of the capture standards used to make the fit in comparison circuits 76 are used in computing the composite standard spectrum in circuits 84. If one or more of the spectra are omitted, however, the composite spectrum produced by summing the weighted standard spectra in circuits 84 should be normalized by dividing the composite spectrum by the sum of the weights for the standard spectra used. The output of circuits 84 is a composite standard spectrum which is sent, as indicated in FIG. 3, to the inelastic standard spectra store 68 as the background standard for the inelastic scattering gamma ray spectrum analysis.

FIG. 4 illustrates a flow diagram for implementing the foregoing capture spectrum pre-analysis and inelastic scattering spectrum analysis steps on a general purpose digital computer. Upon completion of transfer of a capture spectrum from the acquisition buffer 58 to the storage buffer (not shown) in computer 60, which in the embodiment described occurs every 80 seconds, the computer is instructed to enter the pre-analysis program for the capture spectrum. The computer is then instructed at 86 to read the unknown capture spectrum and at 88 to read all of the capture standard spectra. Under instruction at 90, the computer (circuits 76) next performs a weighted least squares analysis of the unknown capture spectrum to determine the weights ($\omega_i$) of the postulated constituents which produce the best fit between the unknown capture spectrum and the composite spectrum made up of the standard spectra. The computer then checks at 92 to see if any of the constituent weights are less than or equal to a predetermined level X, e.g. 1%. If so, and with switch 94 in the second or upper position in FIG. 4, the computer is instructed at 96 to eliminate the standard spectrum or spectra in question and to return to step 88 and read in the remaining standard spectra. The computer next performs another weighted least squares fit of the unknown capture spectrum using only the remaining standards to make up the composite spectrum. This process is continued until all of the constituent weights are greater than the predetermined level. The final constituents are thus those which have contributed significantly to the unknown capture spectrum and hence, by way of background, to the detected inelastic scattering spectrum.

Alternatively, where it is desired to conserve computing time at a slight sacrifice in the precision of the capture weights ($\omega_i$), the switch 94 may be placed in the first or lower position in FIG. 4, with the capture standard spectra corresponding to the weights determined by the initial weighted-least-squares fit of the capture spectrum then being used to compute a composite background standard spectrum or used directly as the standard background spectra for analysis of the detected inelastic scattering spectrum.

With either position of switch 94, it will be understood that all of the capture standard spectra may be retained in the composite spectrum, this being primarily a question of the selection of the value of X.

When the Yes-No test at 92 indicates that all of the remaining constituent proportions are greater than the predetermined level, or, as aforementioned, when the switch at box 94 is in the first position, the computer next is instructed at 98 to read the capture standard spectra for all of the capture constituent weights ($\omega_i$) found at test 92 to be greater than X. It is then instructed at 100 to read the corresponding weights. If one or more of the capture standards have been eliminated, by virtue of their weights ($\omega_i$) being less than X, the computer is instructed at 102 to sum all of the weights read at 100 to produce $\Sigma\omega_i$. The computer then divides each constituent weight ($\omega_i$) by $\Sigma\omega_i$ to renormalize the weights, as indicated by box 104. If desired, the computer may also be instructed at 106 to read out to the recorder 72 all of the renormalized capture constituent weights ($\omega_i$). As mentioned, suitable ratios of these weights may be formed and recorded as indicators of formation parameters or characteristics of interest.

Depending on the state of switch 108, which is preset by the operator, the computer next chooses the source of the capture standard spectrum or spectra to be used for background purposes in the inelastic spectrum fit. Switch 108 corresponds to the ganged switch 82 in FIG. 3, and it will be understood that it will be set in one position or the other depending upon whether the capture standards are to be used as background standards for the inelastic spectrum analysis or whether the composite background standard spectrum is to be so used.

If a composite capture spectrum has been selected, the computer is instructed in box 110 to multiply each capture standard read under instruction 98 by its renormalized weight ($\omega_i$) from box 104. The weighted spectra thus produced are then added by the computer, as indicated by box 112, to produce the composite spectrum. Upon completion of operation 112, the computer enters the analysis program for the unknown inelastic scattering spectrum at 120. If switch 108 is preset to select the capture standards for $\omega_i > X$ as the background standard spectra, the computer is instructed at 122 to read the appropriate capture standard spectra and then to enter the inelastic spectrum analysis program at 120.

Upon entering the inelastic spectrum analysis program, the computer is instructed at 124 to read the inelastic scattering gamma ray standard spectra, one for each of the constituents postulated to have contributed to the inelastic scattering spectrum. Under instruction at 126, the computer then performs a weighted least squares fit of the inelastic scattering spectrum to determine the constituent weights ($\omega_i$) producing the best match between the inelastic spectrum and the composite spectrum made up of the inelastic standards and the standard background spectra or standard composite background spectrum, as the case may be depending on the position of switch 108. The constituent inelastic weights or proportions thus determined, and suitable ratios thereof, are then read out at 128 to the recorder 72 and recorded as a function of sonde depth.

In view of the different accumulation times for the inelastic scattering spectrum acquisition buffer 56, e.g. 20 seconds, and the capture spectrum acquisition buffer 58, e.g. 80 seconds, it will be understood that a new capture spectrum would not be presented for normalization, as in the upper and middle positions of switch 64, or pre-analysis of a detected capture spectrum carried out, as in the middle and lower positions of switch 64, each time a new inelastic scattering spectrum is available for analysis. According to the invention, however, the capture gamma ray spectrum utilized to provide the standard background spectrum or spectra is repetitively updated as frequently as possible commensurate with the taking of capture spectra of sufficient statistical accuracy. With the exemplary accumulation times given herein, a new inelastic scattering spectrum would, for example, be provided every 20 seconds and a new capture spectrum every 80 seconds.

Although the invention has been illustrated and described herein with reference to specific embodiments thereof, it will be understood that such embodiments are susceptible of modification and variation without departing from the inventive concepts embodied therein. All such modifications and variations, therefore, are intended to be encompassed within the spirit and scope of the appended claims.

We claim:

1. A method for investigating the composition of an earth formation traversed by a well bore, comprising the steps of:
   (a) repetitively irradiating the formation with time-spaced bursts of fast neutrons;
   (b) detecting gamma rays during first time periods related to the occurrence of the neutron bursts such that the detected gamma rays result predominately from inelastic scattering interactions between the incident neutrons and constituents of the formation;
   (c) detecting background gamma rays during second time periods between neutron bursts during which the detected gamma rays result predominately from interactions between incident neutrons and constituents of the formation other than inelastic scattering interactions;
   (d) generating an energy spectrum of the predominately inelastic scattering gamma rays detected in step (b);
   (e) generating an energy spectrum of the background gamma rays detected in step (c);
   (f) utilizing the background gamma ray spectrum to provide one or more standard background gamma ray spectra; and
   (g) comparing the predominately inelastic scattering gamma ray spectrum with a composite spectrum, made up of weighted standard spectra of constituents postulated to have contributed to said inelastic scattering gamma ray spectrum and including among said standard spectra said one or more standard background spectra, to determine the proportions in the formation of the postulated constituents.

2. The method of claim 1 wherein:
said standard spectra include spectra for carbon and oxygen; and
the comparing step includes determining the proportions of carbon and oxygen.

3. The method of claim 2 wherein:
said standard spectra include a spectrum for each of one or more postulated constituents representative of the lithology of the formation; and
the comparing step includes determining the proportion of each of the said lithology constituents.

4. The method of claim 3 wherein the lithology constituents comprise calcium and silicon.

5. The method of claim 1 further comprising comparing the background gamma ray spectrum with a composite spectrum, made up of weighted standard spectra of formation constituents postulated to have contributed to said background spectrum, to determine the proportions in the formation of the postulated background-contributing constituents.

6. The method of claim 5 further comprising the step of recording the proportions of the background-contributing constituents and the proportions of the inelastic scattering gamma ray-contributing constituents.

7. The method of claim 1 wherein:
the repetition rate of the neutron bursts is sufficiently high that the background gamma ray occurring during the first detection periods result predominately from thermal neutron capture interactions between formation constituents and incident neutrons from the preceding neutron bursts; and the second time periods between neutron bursts during which the background gamma rays are detected are related to the preceding bursts such that the background gamma rays detected therein result predominately from thermal neutron capture interactions between formation constituents and incident neutrons from the preceding bursts, whereby the background gamma ray spectrum generated in step (e) predominately represents thermal neutron capture gamma rays.

8. The method of claim 7 further comprising comparing the predominately thermal neutron capture gamma ray spectrum with a composite spectrum, made up of weighted standard spectra of constituents postulated to have contributed to said predominately thermal neutron capture spectrum, to determine the proportions in the formation of the postulated thermal neutron capture gamma ray-contributing constituents.

9. The method of claim 1 wherein step (f) comprises:
   (1) normalizing the background gamma ray spectrum to the same total count as the other standard spectra; and
   (2) including the normalized background gamma ray spectrum among said standard spectra in step (g) as the standard background gamma ray spectrum.

10. The method of claim 1 wherein step (f) comprises:
   (1) comparing the background gamma ray spectrum with a composite spectrum, made up of weighted standard spectra of constituents postulated to have contributed to the background spectrum, to identify the constituents which have contributed significantly to the background spectrum; and
   (2) including among said standard spectra in step (g) the standard spectra of step (f) (1) for the background-contributing constituents identified as significant in step (f) (1).

11. The method of claim 10 wherein step (f) (1) comprises:
determining the proportions in the formation of the postulated background-contributing constituents which produce a composite spectrum which most nearly matches the background spectrum; and
determining which constituents have proportions at or greater than a predetermined level to identify the constituents which have contributed significantly to the background spectrum.

12. The method of claim 1 wherein step (e) further comprises repetitively updating the background gamma ray spectrum to account for variations during the detection and generation of the background spectrum in factors which affect the shape of the background spectrum 13. The method of claim 1 wherein step (f) comprises:
   (1) comparing the background gamma ray spectrum with a composite spectrum, made up of weighted standard spectra of constituents postulated to have contributed to the background spectrum, to determine the proportions in the formation of the postulated background-contributing constituents which produce a composite spectrum which most nearly matches the background spectrum; and
   (2) including among said standard spectra in step (g) as the standard background spectrum a composite spectrum produced from some or all of the background-constituent proportions determined in step (f) (1) and the corresponding background-constituent standard spectra.

14. A method of investigating the composition of an earth formation, comprising the steps of:
  (a) providing an energy spectrum of gamma rays detected during first time periods related to a succession of time-spaced bursts of fast neutrons such that the detected gamma rays result predominately from inelastic scattering interactions between the incident neutrons and constituents of the formation;
  (b) providing an energy spectrum of background gamma rays detected during second time periods between said neutron bursts during which the detected gamma rays result predominately from interactions between the incident neutrons and constituents of the formation other than inelastic scattering interactions;
  (c) utilizing the background gamma ray spectrum to provide one or more standard background gamma ray spectra; and
  (d) comparing the predominately inelastic scattering gamma ray spectrum with a composite spectrum, made up of weighted standard spectra of constituents postulated to have contributed to said inelastic scattering gamma ray spectrum and including among said standard spectra said one or more standard background spectra, to determine the proportions in the formation of the postulated constituents.

15. The method of claim 14 wherein:
  said standard spectra include spectra for carbon and oxygen; and
  the comparing step includes determining the proportions of carbon and oxygen.

16. The method of claim 15 wherein:
  said standard spectra include a spectrum for each of one or more postulated constituents representative of the lithology of the formation; and
  the comparing step includes determining the proportion of each of the lithology constituents.

17. The method of claim 16 wherein the lithology constituents comprise calcium and silicon.

18. The method of claim 14 further comprising comparing the background gamma ray spectrum with a composite spectrum, made up of weighted standard spectra of formation constituents postulated to have contributed to said background spectrum, to determine the proportions in the formation of the postulated background-contributing constituents.

19. The method of claim 18 further comprising the step of recording the proportions of the background-contributing constituents and the proportions of the inelastic scattering gamma ray-contributing constituents.

20. The method of claim 14 wherein:
  the repetition rate of the neutron bursts was sufficiently high such that the background gamma rays which occurred during the first detection periods resulted predominately from thermal neutron capture interactions between formation constituents and incident neutrons from the preceding neutron bursts; and
  the second time periods between neutron bursts during which the background gamma rays were detected were related to the preceding bursts such that the background gamma rays detected resulted predominately from thermal neutron capture interactions between formation constituents and incident neutrons from the preceding bursts, whereby the background gamma ray spectrum provided in step (b) predominately represents thermal neutron capture gamma rays.

21. The method of claim 20 further comprising comparing the predominately thermal neutron capture gamma ray spectrum with a composite spectrum, made up of weighted standard spectra of constituents postulated to have contributed to said thermal neutron capture spectrum, to determine the proportions in the formation of the postulated thermal neutron capture gamma ray-contributing constituents.

22. The method of claim 14 wherein step (c) comprises:
  (1) normalizing the background gamma ray spectrum to the same total count as the other standard spectra; and
  (2) including the normalized background gamma ray spectrum among said standard spectra as the standard background gamma ray spectrum.

23. The method of claim 14 wherein step (c) comprises:
  (1) comparing the background gamma ray spectrum with a composite spectrum, made up of weighted standard spectra of constituents postulated to have contributed to the background spectrum, to identify the constituents which have contributed significantly to the background spectrum; and
  (2) including among said standard spectra in step (d) the standard spectra of step (c) (1) for the background-contributing constituents identified pursuant to step (c) (1).

24. The method of claim 23 wherein step (c) (1) comprises:
  determining the proportions in the formation of the postulated background-contributing constituents which produce a composite spectrum which most nearly matches the background spectrum; and
  determining which constituents have proportions at or greater than a predetermined level to identify the constituents which have contributed significantly to the background spectrum.

25. The method of claim 14 wherein step (b) further comprises repetitively updating the background gamma ray spectrum to account for variations during the detection and generation of the background spectrum in factors which affect the shape of the background spectrum.

26. The method of claim 14 wherein step (c) comprises:
  (1) comparing the background gamma ray spectrum with a composite spectrum, made up of weighted standard spectra of constituents postulated to have contributed to the background spectrum, to determine the proportions in the formation of the postulated background-contributing constituents which produce a composite spectrum which most nearly matches the background spectrum; and
  (2) including among said standard spectra in step (d) as the standard background spectrum a composite spectrum produced from some or all of the background-constituent proportions determined in step (c) (1) and the corresponding background-constituent standard spectra.

27. Apparatus for investigating the composition of an earth formation traversed by a well bore, comprising:
  (a) means for repetitively irradiating the formation with time-spaced bursts of fast neutrons;

(b) means for detecting gamma rays resulting from interactions between the incident neutrons and constituents of the formation and for generating pulses representative of the energies of the detected gamma rays;
(c) means responsive to the pulses from the detector means for segregating them into a plurality of channels according to the energies of the corresponding gamma rays, thereby to generate an energy spectrum of said corresponding rays;
(d) means for controlling the operation of the spectrum generating means so as (1) to generate an energy spectrum of gamma rays detected during first time periods related to the occurrence of the neutron bursts such that the gamma rays detected therein result predominately from inelastic scattering neutron interactions and (2) to generate an energy spectrum of background gamma rays detected during second time periods between neutron bursts during which the detected gamma rays result predominately from neutron interactions other than inelastic scattering interactions;
(e) means for utilizing signals representing the background gamma ray spectrum to provide signals representing one or more standard background gamma ray spectra; and
(f) spectra-comparing means responsive to signals representing the predominately inelastic scattering gamma ray spectrum and to signals representing a composite spectrum, made up of weighted standard spectra of constituents postulated to have contributed to said inelastic scattering gamma ray spectrum and including among said standard spectra said one or more standard background spectra, for determining the proportions in the formation of the postulated constituents.

28. The apparatus of claim 27 further comprising spectra-comparing means responsive to signals representing the background gamma ray spectrum and to signals representing a composite spectrum, made up of weighted standard spectra of formation constituents postulated to have contributed to said background spectrum, for determining the proportions in the formation of the postulated background-contributing constituents.

29. The apparatus of claim 28 further comprising means for recording the proportions of the background-contributing constituents and the proportions of the inelastic scattering gamma ray-contributing constituents.

30. The apparatus of claim 27 wherein:
the irradiating means includes means for repeating the neutron bursts at a rate sufficiently high that the background gamma rays occurring during said first time periods result predominately from thermal neutron capture interactions between formation constituents and incident neutrons from the preceding neutron bursts; and
the means for controlling the operation of the spectrum generating means so controls the occurrence of the second time periods that the background gamma rays detected therein result predominately from thermal neutron capture interactions between formation constituents and incident neutrons from the preceding neutron bursts, whereby the background gamma ray spectrum predominately represents thermal neutron capture gamma rays.

31. The apparatus of claim 30 further comprising spectra-comparing means responsive to signals representing the predominately thermal neutron capture gamma ray spectrum and to signals representing a composite spectrum, made up of weighted standard spectra of constituents postulated to have contributed to said thermal neutron capture spectrum, for determining the proportions in the formation of the postulated thermal neutron capture gamma ray-contributing constituents.

32. The apparatus of claim 27 wherein the utilizing means of paragraph (e) comprises:
(1) means for normalizing the signals representing the background gamma ray spectrum to the same total count as the other standard spectra; and
(2) means for including signals representing the normalized background gamma ray spectrum among said standard spectra as the standard background gamma ray spectrum.

33. The apparatus of claim 27 wherein the utilizing means of paragraph (e) comprises:
(1) spectra-comparing means responsive to the signals representing the background gamma ray spectrum and to signals representing a composite spectrum, made up of weighted standard spectra of constituents postulated to have contributed to the background spectrum, for identifying the constituents which have contributed significantly to the background spectrum; and
(2) means for including among said standard spectra employed by the spectra-comparing means of paragraph (f) signals representing the standard spectra employed by the spectra-comparing means of paragraph (e) (1) for the background-contributing constituents identified as significant by the means of paragraph (e) (1).

34. The apparatus of claim 33 wherein the spectra-comparing means of paragraph (e) (1) comprises:
means for determining the proportions in the formation of the postulated background-contributing constituents which produce a composite spectrum which most nearly matches the background spectrum; and
means for determining which constituents have proportions at or greater than a predetermined level to identify the constituents which have contributed significantly to the background spectrum.

35. The apparatus of claim 27 wherein the controlling means of paragraph (d) includes means for repetitively updating the background gamma ray spectrum to account for variation during the detection and generation of the background spectrum in factors which affect the shape of the background spectrum.

36. The apparatus of claim 27 wherein the utilizing means of paragraph (e) comprises:
(1) spectra-comparing means responsive to signals representing the background gamma ray spectrum and to signals representing a composite spectrum, made up of weighted standard spectra of constituents postulated to have contributed to the background spectrum, for determining the proportions in the formation of the postulated background-contributing constituents which produce a composite spectrum which most nearly matches the background spectrum; and
(2) means for including among said standard spectra employed by the spectra-comparing means of paragraph (f) signals representing a composite spectrum produced from some or all of the background-constituent proportions determined by the spectra-comparing means of paragraph (e) (1) and the corresponding background-constituent standard spectra.

37. Apparatus for investigating the composition of an earth formation, comprising:
  (a) means for providing signals representing an energy spectrum of gamma rays detected during first time periods related to a succession of time-spaced bursts of fast neutrons such that the detected gamma rays result predominately from inelastic scattering interactions between the incident neutrons and constituents of the formation;
  (b) means for providing signals representing an energy spectrum of background gamma rays detected during second time periods between said neutron bursts during which the detected gamma rays result predominately from interactions between the incident neutrons and constituents of the formation other than inelastic scattering interactions;
  (c) means for utilizing the signals representing the background gamma ray spectrum to provide signals representing one or more standard background gamma ray spectra; and
  (d) spectra-comparing means responsive to signals representing the predominately inelastic scattering gamma ray spectrum and to signals representing a composite spectrum, made up of weighted standard spectra of constituents postulated to have contributed to said inelastic scattering gamma ray spectrum and including among said standard spectra said one or more standard background spectra, for determining the proportions in the formation of the postulated constituents.

38. The apparatus of claim 37 further comprising spectra-comparing means responsive to signals representing the background gamma ray spectrum and to signals representing a composite spectrum, made up of weighted standard spectra of formation constituents postulated to have contributed to said background spectrum, for determining the proportions in the formation of the postulated background-contributing constituents.

39. The apparatus of claim 38 further comprising means for recording the proportions of the background-contributing constituents and the proportions of the inelastic scattering gamma ray-contributing constituents.

40. The apparatus of claim 37 wherein the utilizing means of paragraph (c) comprises:
  (1) means for normalizing the signals representing the background gamma ray spectrum to the same total count as the other standard spectra; and
  (2) means for including signals representing the normalized background gamma ray spectrum among said standard spectra as the standard background gamma ray spectrum.

41. The apparatus of claim 37 wherein the utilizing means of paragraph (c) comprises:
  (1) spectra-comparing means responsive to the signals representing the background gamma ray spectrum and to signals representing a composite spectrum, made up of weighted standard spectra of constituents postulated to have contributed to the background spectrum, for identifying the constituents which have contributed significantly to the background spectrum; and
  (2) means for including among the standard spectra employed by the spectra-comparing means of paragraph (d) signals representing the standard spectra employed by the spectra-comparing means of paragraph (c) (1) for those background-contributing constituents identified as significant by the spectra-comparing means of paragraph (c) (1).

42. The apparatus of claim 41 wherein the spectra-comparing means of paragraph (c) (1) comprises:
  means for determining the proportions in the formation of the postulated background-contributing constituents which produce a composite spectrum which most nearly matches the background spectrum; and
  means for determining which constituents have proportions at or greater than a predetermined level to identify the constituents which have contributed significantly to the background spectrum.

43. The apparatus of claim 37 wherein the spectrum providing means of paragraph (b) includes means for repetitively updating the background gamma ray spectrum to account for variations during the detection and generation of the background spectrum in factors which affect the shape of the background spectrum.

44. The apparatus of claim 37 wherein the utilizing means of paragraph (c) comprises:
  (1) spectra comparing means responsive to signals representing the background gamma ray spectrum and to signals representing a composite spectrum, made up of weighted standard spectra of constituents postulated to have contributed to the background spectrum, for determining the proportions in the formation of the postulated background-contributing constituents which produce a composite spectrum which most nearly matches the background spectrum; and
  (2) means for including among said standard spectra employed by the spectra-comparing means of paragraph (d) signals representing a composite spectrum produced from some or all of the background-constituent proportions determined by the spectra-comparing means of paragraph (c) (1) and the corresponding background-constituent standard spectra.

45. A method for investigating the composition of an earth formation traversed by a well bore, comprising the steps of:
  (a) generating an energy spectrum of radiation detected in the well bore and including (1) a component representative of the composition of the formation and (2) a component representative of background radiation;
  (b) generating an energy spectrum of said background component;
  (c) utilizing the background spectrum of step (b) to provide one or more standard background spectra; and
  (d) comparing the spectrum of step (a) with a composite spectrum, made up of weighted standard spectra of constituents postulated to have contributed to the spectrum of step (a) and including among said standard spectra said one or more standard background spectra, to determine the proportions in the formation of the postulated constituents.

46. The method of claim 45 further comprising comparing the background spectrum of step (b) with a composite spectrum, made up of weighted standard spectra of formation constituents postulated to have contributed to said background spectrum, to determine the proportions in the formation of the postulated background-contributing constituents.

47. The method of claim 45 wherein step (c) comprises:
  (1) normalizing the background spectrum to the same total count as the other standard spectra; and
  (2) including the normalized background spectrum among said standard spectra in step (d) as the standard background spectrum.

48. The method of claim 47 wherein step (c) comprises:
  (1) comparing the background spectrum with a composite spectrum, made up of weighted standard spectra of constituents postulated to have contributed to the background spectrum, to identify the constituents which have contributed significantly to the background spectrum; and
  (2) including among said standard spectra in step (d) the standard spectra of step (c) (1) for the background-contributing constituents identified as significant in step (c) (1).

49. The method of claim 48 wherein step (c) (1) comprises:
  determining the proportions in the formation of the postulated background-contributing constituents which produce a composite spectrum which most nearly matches the background spectrum; and
  determining which constituents have proportions at or greater than a predetermined level to identify the constituents which have contributed significantly to the background spectrum.

50. The method of claim 45 further comprising:
  (e) repetitively generating the spectrum of step (a);
  (f) repetitively updating the background spectrum of step (b) to account for the variation in factors which affect the shape of the background spectrum; and
  (g) utilizing the updated background spectrum of step (f) in step (c) to provide said one or more standard background spectra.

51. The method of claim 45 wherein step (a) comprises:
  (1) repetitively irradiating the formation with time-spaced bursts of fast neutrons; and
  (2) generating said energy spectrum of gamma rays detected during time periods related to the occurrence of the neutron bursts such that the detected gamma rays result predominately from inelastic scattering interactions between the incident neutrons and constituents of the formation.

52. Apparatus for investigating the composition of an earth formation traversed by a well bore, comprising:
  (a) means for generating an energy spectrum of radiation detected in the well bore including (1) a component representative of the composition of the formation and (2) a component representative of background radiation;
  (b) means for generating an energy spectrum of said background component;
  (c) means for utilizing signals representing the background spectrum to provide signals representing one or more standard background spectra; and
  (d) spectra-comparing means responsive to signals representing the spectrum of step (a) and to signals representing a composite spectrum, made up of weighted standard spectra or constituents postulated to have contributed to the spectrum of step (a) and including among said standard spectra said one or more standard background spectra, for determining the proportions in the formation of the postulated constituents.

53. The apparatus of claim 52 further comprising spectra-comparing means responsive to signals representing the background spectrum and to signals representing a composite spectrum, made up of weighted standard spectra of formation constituents postulated to have contributed to said background spectrum, for determining the proportions in the formation of the postulated background-contributing constituents.

54. The apparatus of claim 52 wherein the utilizing means of paragraph (c) comprises:
  (1) means for normalizing the signals representing the background spectrum to the same total count as the other standard spectra; and
  (2) means for including signals representing the normalized background spectrum among said standard spectra as the standard background spectrum.

55. The apparatus of claim 52 wherein the utilizing means of paragraph (c) comprises:
  (1) spectra-comparing means responsive to the signals representing the background spectrum and to signals representing a composite spectrum, made up of weighted standard spectra of constituents postulated to have contributed to the background spectrum, for identifying the constituents which have contributed significantly to the background spectrum; and
  (2) means for including among said standard spectra employed by the spectra-comparing means of paragraph (d) signals representing the standard spectra employed by the spectra-comparing means of paragraph (c) (1) for the background-contributing constituents identified as significant by the means of paragraph (c) (1).

56. The apparatus of claim 55 wherein the spectra-comparing means of paragraph (c) (1) comprises:
  means for determining the proportions in the formation of the postulated background-contributing constituents which produce a composite spectrum which most nearly matches the background spectrum; and
  means for determining which constituents have proportions at or greater than a predetermined level to identify the constituents which have contributed significantly to the background spectrum.

57. The apparatus of claim 52 further comprising:
  (e) means for repetitively generating the spectrum of paragraph (a);
  (f) means for repetitively updating the background spectrum of paragraph (b) to account for the variations in factors which affect the shape of the background spectrum; and
  (g) means for utilizing the updated background spectrum of paragraph (f) in the means of paragraph (c) to provide said one or more standard background spectra.

58. The apparatus of claim 52 wherein the spectrum generating means of paragraph (a) comprises:
  (1) means for repetitively irradiating the formation with time-spaced bursts of fast neutrons; and
  (2) means for generating said energy spectrum of gamma rays detected during time periods related to the occurrence of the neutron bursts such that the detected gamma rays result predominately from inelastic scattering interactions between the incident neutrons and constituents of the formation.

* * * * *